UNITED STATES PATENT OFFICE.

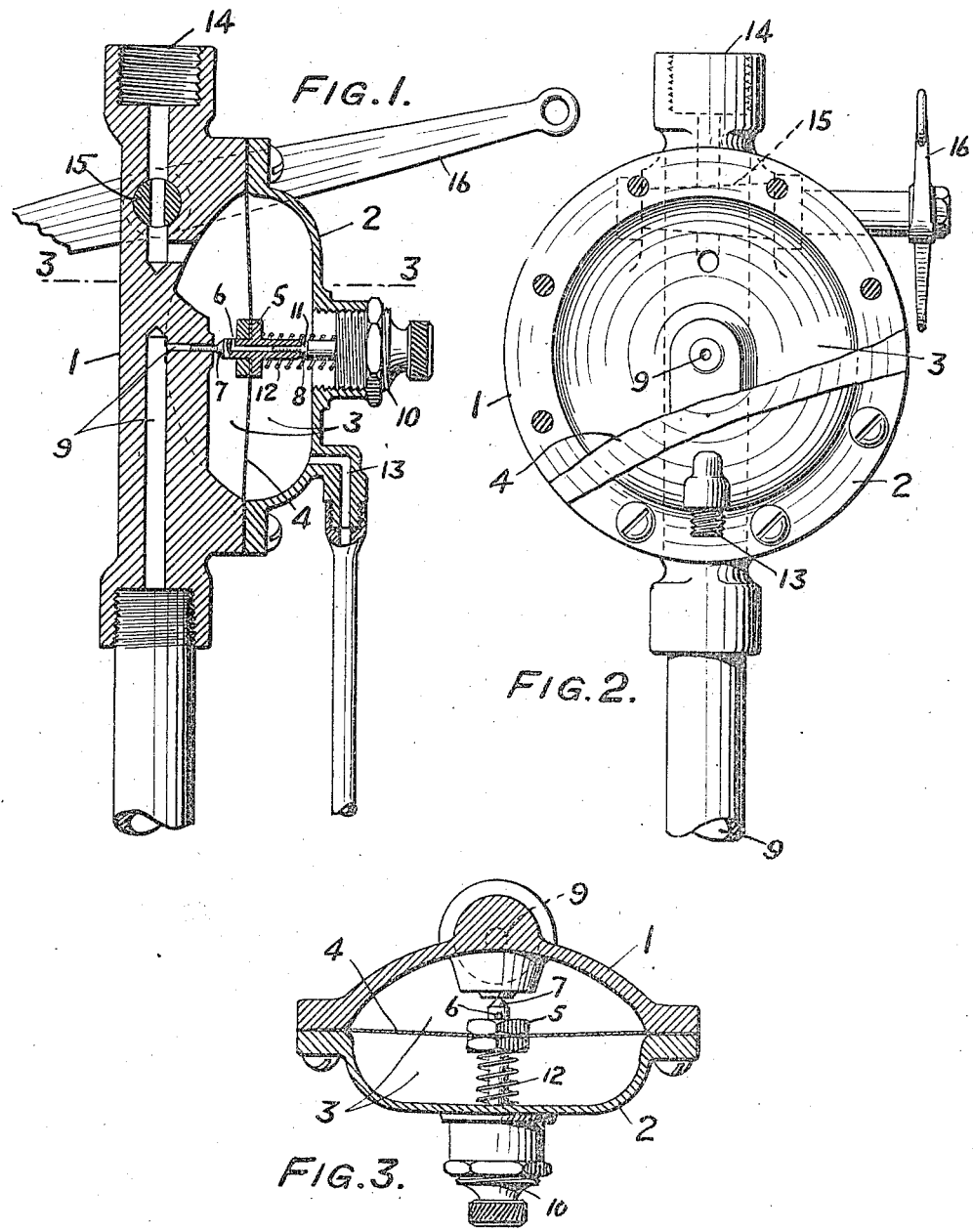

VICTOR H. SLINACK, OF PHILADELPHIA, PENNSYLVANIA, ASSIGNOR TO THE PENNSYLVANIA GLOBE GAS LIGHT COMPANY, OF PHILADELPHIA, PENNSYLVANIA, A CORPORATION OF PENNSYLVANIA.

AUTOMATIC GAS-DISTRIBUTER.

1,090,798.  Specification of Letters Patent. Patented Mar. 17, 1914.

Application filed December 17, 1912. Serial No. 737,192.

*To all whom it may concern:*

Be it known that I, VICTOR H. SLINACK, a citizen of the United States, and a resident of Philadelphia, in the county of Philadelphia and State of Pennsylvania, have invented a certain new and useful Automatic Gas-Distributer, of which the following is a specification.

The principal object of the present invention is to provide a compact, reliable, and efficient device which shall respond to changes of pressure of the gas which it receives and operate to distribute gas to one outlet or burner connection when low pressure is sustained and to another outlet or burner connection when high pressure is sustained.

The invention will be claimed at the end hereof, but will be first described in connection with the embodiment of it selected from many other embodiments for illustration in the accompanying drawings, in which—

Figure 1, is a central sectional view of the distributer. Fig. 2, is a front view with parts broken away, and Fig. 3, is a sectional view taken on the line 3—3 of Fig. 1 looking downward.

In the drawings there is a housing shown as made in two parts 1 and 2. Within this housing there is a closed distribution chamber 3.

4, is an impervious diaphragm shown as clamped between the parts 1 and 2 and it serves to subdivide the distribution chamber. The diaphragm carries a fitting 5, shown as made in two parts, and through this fitting there is a duct 6 having an opening on each side of the diaphragm. At one end the fitting is provided with a valve 7 and at the other end with a valve-seat 8. The valve 7 has a guiding projection which works in an off-take 9 that may extend, for example, to the main burner of a light. The adjustable plug 10, shown as having screw and thread connection through an opening in the housing is provided with a valve 11 that coöperates with the seat 8 and is provided with a guiding extension that works in the duct 6.

12, is a spring tending to shift the diaphragm toward the left in Fig. 1.

13, is a gas off-take for example to the pilot burner of a light.

14, is a gas inlet connection communicating with the distribution chamber on one side of the diaphragm. It is adapted to receive a supply of gas at sustained high or at sustained low pressure, for example, from a single line of pipe in which the pressure may be low in the daytime and high at night.

15 is a valve in the inlet connection which can be operated by means of the lever 16 and the purpose of this valve is to shut off the supply of gas in case of emergency or the like.

The mode of operation of the described automatic pressure responsive gas distributer may be explained as follows:—When the pressure of the gas supplied to the inlet 14 is maintained low, the spring 11 shifts the diaphragm toward the left in Fig. 1 thus the valve 7 cuts off the gas supply to the outlet 9 and there is an opening between the valve 11 and its seat 8 so that gas passes through the duct 6 and reaches the part of the chamber to the right of the diaphragm and thence passes by the outlet 13 to, for example, the pilot light. This is the condition of affairs corresponding, for example, to daytime. When the gas supplied to the inlet 14 is sustained at high pressure, such pressure overcomes the spring 12, shifts the diaphragm toward the right and holds it in that position; thus the valve 7 uncovers its seat and the seat 8 covers the valve 11, more or less. Thus the supply of gas at high pressure is fed to the outlet connection 9, but not to the outlet connection 13 or in very small quantity. If the outlet connection 9 be connected to the main burner of a light this would be the condition of affairs corresponding to night time. It is evident that when the pressure is changed from low to high the pilot lights light the main burners and when the pressure is changed from high to low the main burners light the pilot lights, if extinguished. The movement of the diaphragm and the opening and closing of the respective valves is properly timed or made sufficiently slow to accomplish this result. In other words the diaphragm is comparatively slowly responsive to a change of pressure which is sustained.

This application is concurrent with my application serially numbered 737,191, filed Dec. 17, 1912.

It will be obvious to those skilled in the art that modifications may be made in details, hence my invention is not limited in that regard, but

What I claim is:

1. In an automatic gas distributer the combination of a housing having a distribution chamber, a diaphragm subdividing the chamber, a valve seat and a valve arranged in alinement on opposite walls of the chamber and the valve provided with an extension guide, and a tubular fitting carried by the diaphragm and receiving the guide extension and provided with a seat for said valve and with a valve for the first mentioned seat, and said last mentioned valve provided with an extension guide, substantially as described.

2. An automatic gas distributer comprising the combination of a housing, a spring pressed diaphragm sub-dividing the housing into two chambers and having a duct through its center portion, an outlet from one of said chambers constituting the sole pilot light supply, a gas inlet to and a main burner supply outlet from the other chamber, a valve carried by the diaphragm for opening and closing the main burner outlet, and a valve in the first mentioned chamber for opening and closing said duct to admit and exclude gas to and from said chamber for lighting and extinguishing a pilot light.

3. An automatic gas distributer comprising the combination of a housing, a spring pressed diaphragm sub-dividing the housing into two chambers and having a duct through its center portion, an outlet from one of said chambers constituting the sole pilot light supply, a gas inlet to and a main burner supply outlet from the other chamber, a valve carried by the diaphragm for opening and closing the main burner outlet, and a valve adjustable toward and away from the diaphragm and arranged in the first mentioned chamber for opening and closing said duct to admit and exclude gas to and from said chamber for lighting and extinguishing a pilot light.

VICTOR H. SLINACK.

Witnesses:
CLIFFORD K. CASSEL,
FRANK E. FRENCH.